US008914729B2

(12) United States Patent
Dubinko et al.

(10) Patent No.: US 8,914,729 B2
(45) Date of Patent: Dec. 16, 2014

(54) METHODS AND SYSTEMS FOR PROVIDING A CUSTOMIZABLE GUIDE FOR NAVIGATING A CORPUS OF CONTENT (75) Inventors: Micah Dubinko, Sunnyvale, CA (US); Joseph Magnani, San Francisco, CA (US); Jasmine Novak, Mountain View, CA (US); Ravi Kumar, Berkeley, CA (US); Prabhakar Raghavan, Saratoga, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1594 days.

(21) Appl. No.: 11/590,045

(22) Filed: Oct. 30, 2006

(65) Prior Publication Data
US 2008/0104521 A1    May 1, 2008

(51) Int. Cl.
*G06F 3/00* (2006.01)
*G06F 3/048* (2013.01)
*G06F 3/0484* (2013.01)
G06F 17/30 (2006.01)
H04L 29/06 (2006.01)

(52) U.S. Cl.
CPC .......... *G06F 17/30899* (2013.01); G06F 17/30 (2013.01); *G06F 3/0484* (2013.01); *G06F 17/30867* (2013.01); H04L 65/4084 (2013.01)
USPC ........... 715/738; 715/744; 715/861; 715/811; 715/789; 715/745; 709/219; 709/203; 709/217

(58) Field of Classification Search
CPC ....... G06F 3/0484; G06F 3/048; G06F 17/30; G06F 17/04842; H04L 65/4084
USPC ................ 715/738, 744, 861, 811, 745, 789; 709/219, 203, 217
See application file for complete search history.

(56) References Cited

U.S. PATENT DOCUMENTS

| 5,870,683 | A  | * | 2/1999 | Wells et al. ................... 455/566 |
| 6,564,381 | B1 | * | 5/2003 | Hodge et al. ...................... 725/97 |
| 6,609,096 | B1 | * | 8/2003 | De Bonet et al. ............. 704/500 |
| 6,883,138 | B2 | * | 4/2005 | Rosenholtz et al. .......... 715/207 |
| 6,904,561 | B1 | * | 6/2005 | Faraday et al. ............... 715/202 |
| 7,032,178 | B1 | * | 4/2006 | McKnight et al. ............ 715/747 |
| 7,076,484 | B2 | * | 7/2006 | Dworkis et al. ..................... 1/1 |
| 7,162,473 | B2 | * | 1/2007 | Dumais et al. ....................... 1/1 |
| 7,162,482 | B1 | * | 1/2007 | Dunning ....................... 707/737 |
| 7,178,111 | B2 | * | 2/2007 | Glein et al. .................... 715/848 |

(Continued)

FOREIGN PATENT DOCUMENTS

JP            04181316 A   *   6/1992   ............... G06F 3/14

OTHER PUBLICATIONS

Ito, Hidetosh, JP04181316, 1 page English Abstract., 1992.*

*Primary Examiner* — Ece Hur
(74) *Attorney, Agent, or Firm* — James J. DeCarlo; Greenberg Traurig, LLP (57) ABSTRACT

Methods and systems are described for navigating a corpus of content items stored in one or more information repositories within a distributed communications system. The content items may include video feeds, audio feeds, television broadcasts, website, a web log or the like. Using any browser application, the user views content items presented in an interactive scroll display. Modules are included for filtering, sorting and sampling content to ensure delivery of relevant high-quality content to the user. A feedback mechanism is also included for refining relevance filtering, sorting and sampling processes.

23 Claims, 6 Drawing Sheets

(56) References Cited

U.S. PATENT DOCUMENTS

| | | | |
|---|---|---|---|
| 7,231,405 B2 * | 6/2007 | Xia | 1/1 |
| 7,376,586 B1 * | 5/2008 | Partovi et al. | 705/26.43 |
| 7,519,322 B2 * | 4/2009 | Brown et al. | 455/3.01 |
| 7,818,658 B2 * | 10/2010 | Chen | 715/201 |
| 7,823,076 B2 * | 10/2010 | Borovsky et al. | 715/764 |
| 7,853,897 B2 * | 12/2010 | Ogawa et al. | 715/838 |
| 7,856,602 B2 * | 12/2010 | Armstrong | 715/830 |
| 7,937,450 B2 * | 5/2011 | Janik | 709/217 |
| 7,958,107 B2 * | 6/2011 | Curtis | 707/706 |
| 8,042,063 B1 * | 10/2011 | Lin-Hendel | 715/838 |
| 8,051,387 B2 * | 11/2011 | Tuli et al. | 715/835 |
| 8,060,827 B2 * | 11/2011 | Fischer et al. | 715/745 |
| 8,065,325 B2 * | 11/2011 | Crossley et al. | 707/770 |
| 8,166,129 B2 * | 4/2012 | Gourraud | 709/217 |
| 8,352,572 B2 * | 1/2013 | Gourraud | 709/217 |
| 8,405,683 B2 * | 3/2013 | Martin et al. | 345/687 |
| 8,463,893 B2 * | 6/2013 | Clark | 709/224 |
| 2002/0046293 A1 * | 4/2002 | Kabata et al. | 709/245 |
| 2002/0099696 A1 * | 7/2002 | Prince | 707/3 |
| 2002/0152458 A1 * | 10/2002 | Eyer et al. | 725/1 |
| 2003/0067554 A1 * | 4/2003 | Klarfeld et al. | 348/461 |
| 2003/0167471 A1 * | 9/2003 | Roth et al. | 725/87 |
| 2004/0143600 A1 * | 7/2004 | Musgrove et al. | 707/104.1 |
| 2004/0267700 A1 * | 12/2004 | Dumais et al. | 707/2 |
| 2005/0198068 A1 * | 9/2005 | Mukherjee et al. | 707/104.1 |
| 2005/0210101 A1 * | 9/2005 | Janik | 709/203 |
| 2005/0234858 A1 * | 10/2005 | Torii et al. | 707/1 |
| 2005/0251760 A1 * | 11/2005 | Sato et al. | 715/856 |
| 2006/0031776 A1 * | 2/2006 | Glein et al. | 715/779 |
| 2006/0149813 A1 * | 7/2006 | Janik | 709/203 |
| 2006/0199616 A1 * | 9/2006 | Landschaft et al. | 455/566 |
| 2007/0022379 A1 * | 1/2007 | Hara et al. | 715/723 |
| 2007/0027744 A1 * | 2/2007 | Carson et al. | 705/10 |
| 2007/0078832 A1 * | 4/2007 | Ott et al. | 707/3 |
| 2007/0130509 A1 * | 6/2007 | Gombert et al. | 715/513 |
| 2007/0185777 A1 * | 8/2007 | Pyle et al. | 705/26 |
| 2007/0198951 A1 * | 8/2007 | Frank | 715/838 |
| 2008/0177994 A1 * | 7/2008 | Mayer | 713/2 |
| 2008/0209351 A1 * | 8/2008 | Macadaan et al. | 715/762 |
| 2008/0294607 A1 * | 11/2008 | Partovi et al. | 707/3 |
| 2009/0019369 A1 * | 1/2009 | Borovsky et al. | 715/736 |
| 2009/0133071 A1 * | 5/2009 | Sakai et al. | 725/46 |
| 2009/0210902 A1 * | 8/2009 | Slaney et al. | 725/34 |
| 2009/0217315 A1 * | 8/2009 | Malik et al. | 725/9 |
| 2009/0320059 A1 * | 12/2009 | Bolyukh | 725/32 |
| 2010/0125874 A1 * | 5/2010 | Ahn et al. | 725/41 |
| 2010/0146397 A1 * | 6/2010 | Koch et al. | 715/739 |
| 2010/0259645 A1 * | 10/2010 | Kaplan et al. | 348/231.99 |
| 2011/0016391 A1 * | 1/2011 | Borovsky et al. | 715/702 |
| 2011/0083096 A1 * | 4/2011 | Armstrong | 715/774 |
| 2012/0167125 A1 * | 6/2012 | Grubb | 725/14 |
| 2013/0033643 A1 * | 2/2013 | Kim et al. | 348/563 |

* cited by examiner

METHODS AND SYSTEMS FOR PROVIDING A CUSTOMIZABLE GUIDE FOR NAVIGATING A CORPUS OF CONTENT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention is directed to navigating content within a distributed communications system. More specifically, the present invention is directed to systems and methods for distributing relevant content stored in one or more information repositories to a plurality of users.

BACKGROUND OF THE INVENTION

Since the advent of the global-based Internet, the hypertext transport protocol that the World Wide Web ("WWW" or "Web") utilizes has rapidly evolved as a standard protocol for information retrieval systems for distributing, discovering, and accessing content of various types. The sheer volume of content available from the Web continues to accelerate. This is due, at least in part, to the rapid proliferation of digitized images, video, and audio, and perhaps more importantly, to the increasing ubiquitous availability of the underlying Internet as a medium for accessing and exchanging content in a relatively inexpensive fashion.

It is important to be able to target Internet users in a manner that is most likely to attract their attention and encourage them to download, view, subscribe, or otherwise purchase the marketed content. From the perspective of Internet users, a Web site visitor must engage in the tedious and time-consuming process of browsing multiple sites to search for informative and entertaining content. At each site, multiple content items must be carefully sorted and analyzed, before the visitor may find an item of interest.

Therefore due to the vast and continuous growth of content available on Web sites, it has become increasingly more difficult to search for highly relevant content. This difficulty is due, at least in part, to a lack of effective tools to support targeted exploration of information repositories. For example, tagging is one tool that is useful for exploring information repositories. Generally, tagging is a process by which users assign labels in the form of keywords to contents with a purpose to share, discover, and recover the tagged content items. Discovery enables users to find new and interesting content items tagged by other users. Recovery enables a user to recall content items that were previously discovered and tagged.

Recently, an increasing number of tagging services are becoming available on the web, such as the FLICKR™ Web service, the DEL.ICIO.US™ Web service, the MY WEB 2.0 Web service. The FLICKR™ Web service enables users to tag photos and share them with contacts or make them publicly available. The DEL.ICIO.US™ Web service allows users to tag uniform resource locators (URLs) and share tagged URLs with the public. The MY WEB 2.0 web service provides a web-scale social search engine to enable users to find, use, share and expand human knowledge. MY WEB 2.0 allows users to save and tag content items available on the Web, allowing for browsing and searching of content items, as well as sharing content items within a personalized community or with the public.

By analyzing tags associated with content items, a search engine, for example, can search across one or more combinations of tags to find specific content. Even this technique, however, produces a substantially large result set that is difficult to manage and present to a user in meaningful manner. Accordingly, Internet users need to be able to quickly filter out content (e.g., search results) that is not written or recorded in a preferred language, restricted to a preferred geographic region, consistent with local customs or regulations, or several other principles that determine the relevancy of search results.

As more content providers take advantage of the Internet, and as user expectations of Internet applications continue to grow in sophistication, conventional systems of browsing or searching for content have grown inadequate. Conventional systems lack easy-to-learn interactive user interface designs and useful navigational tools for browsing content items.

Accordingly, there is a need for an intelligent and efficient technique for browsing relevant content items from a variety of sources over one or more networks, such as the Web, using a number of disparate client devices.

BRIEF SUMMARY OF THE INVENTION

Methods and systems are described herein for navigating and visualizing a corpus of content items stored on one or more information repositories throughout a widely distributed system. The content may include video, audio, television programming, webcast, or the like. By applying one or more criteria, the content can be tagged or otherwise classified so that the content can be filtered and reduced a smaller, more relevant collection of content. Additionally, a customizable navigational guide can be produced from the tagged content, and distributed to a user to provide a personalized view and enable efficient access to content matching specified relevancy and interest standards.

In an embodiment, a content navigation system includes mechanisms for providing the customizable navigational guide. The content navigation system includes a content distributor that access content from one or more information repositories, and reduces the available content to a relevant subset that matches user preferences or interests. The content distributor includes a culling module, a sorter, a sampling module, and a feedback module. The culling module receives content from an information repository, and may apply one or more culling parameters to filter the content to a more relevant subset. The culling parameters include information pertaining to television programming available in a designated area, local laws and customs, copyright restrictions, digital rights management policies, browser application compatibility, adult content restrictions, or the like.

The sorter receives the filtered content from culling module, and sorts the content based one or more sorting criteria to identify content matching user interests or preferences. The one or more sorting criteria can include modification date, length, content rating, user rating, genre, number of downloads/page views, or the like. The sorting criteria can be specified by a given user or a group of users defining a target market.

The sampling module receives the sorted content from the sorter, and applies one or more sampling schemes to select and forward a sample of the content to a designated client. The sampling schemes may be random, random with weighting based on popularity, burstiness, interestingness, directed (e.g., sampling specified quantity of blocks based on a given axis), or the like.

The content is presented as a customizable navigational guide that allows the user to select a particular content item for downloading or viewing. The feedback module within the content controller enables the functions of the culling module, sorter, and sampling module to be manually or automatically refined. For example, while viewing the navigational guide, a user may send a request to alter the sampling scheme, the sorting criteria, or the culling parameters. Alternatively or in addition, user actions and demographic can be analyzed to automatically update the sampling scheme, the sorting criteria, or the culling parameters.

The customizable navigational guide therefore enables a user to more easily visualize a listing of content that is filtered and sorted to enhance relevancy and interestingness to a particular user or a group of users (e.g., a targeted demographic market). The customizable navigational guide can be presented in one or more display modes, including, for example, a flying video mode or a heat map mode. In flying video mode, the content listing (e.g., content tags or thumbnail images) scrolls or travels across the display area of customizable navigational guide from, for example, left-to-right to produce a flying video effect. In heat map mode, one or more items from a content listing (e.g., content tags or thumbnail images) are visually distinguished to identify items having a higher degree of relevancy or interestingness, including popularity, burstiness, or the like.

BRIEF DESCRIPTION OF THE DRAWINGS

The invention is illustrated in the figures of the accompanying drawings, which are meant to be exemplary and not limiting, in which like reference numbers indicate identical or functionally similar elements, additionally in which the leftmost digit(s) of a reference number identifies the drawing in which the reference number first appears, and in which.

DETAILED DESCRIPTION OF THE PREFERRED EMBODIMENTS

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Methods and systems are described herein for navigating and visualizing a corpus of content items located at one or more local and remote information repositories throughout a widely distributed communications system, such as the global-based Internet. The available content items include images, video, audio, television programming, shared photograph albums, webcasts, movies, sporting events, musical performances, radio broadcasts, news reports, infomercials, online games, weblogs, or other forms of on-demand, unicast, multicast, or broadcast media or multimedia. As described in greater detail below, tags or other classification mechanisms may be analyzed to reduce an initial corpus to a smaller, more relevant collection of content items. Applying specific user or market preferences, a customizable navigational guide may be produced to provide a personalized view of content items and to enable efficient access to content matching specified relevancy and interest standards.

Figure 1:
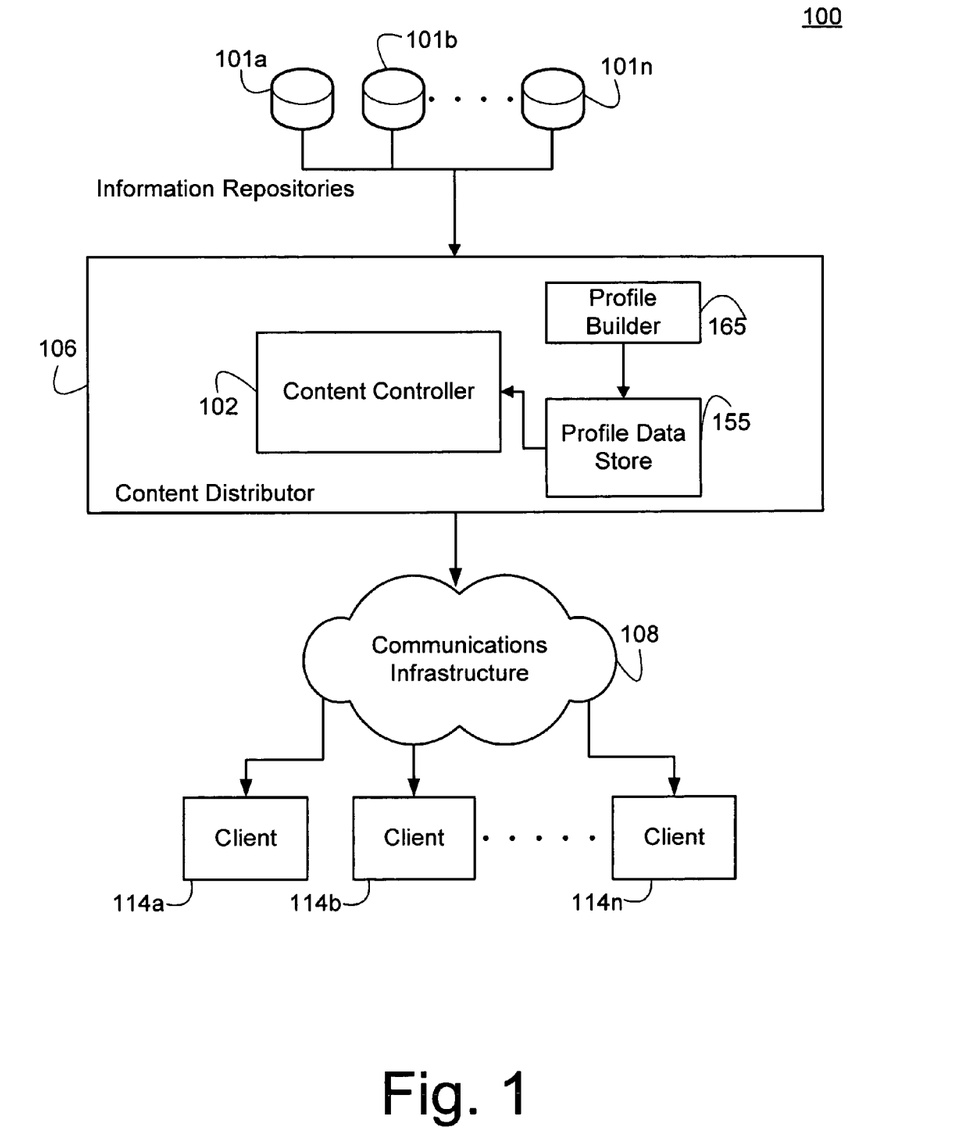
FIG. 1 illustrates a content navigation system according to one embodiment of the present invention.

FIG. 1 illustrates an embodiment of a content navigation system 100 that is operative to provide a customizable navigational guide for visualizing relevant content items for a given user. The content navigation system 100 includes one or more information repositories 101a-101n, a content distributor 106, a communications infrastructure 108, and a plurality of client devices 114a-114n. Content distributor 106 may parse the content items that information repositories 101a-101n maintain to produce a customizable navigational guide that enables the display of relevant content based on one or more user preferences. Upon establishing a session with a given client 114a-114n, content distributor 106 deploys the customizable navigational guide over the communications infrastructure 108 to the client devices 114a-114n, such that a user in communications with the client 114a-114n may select one or more content items for presentation or storage at the client 114a-114n.

The information repositories 101a-101n and the content distributor 106 may include one or more distributed servers (such as Web servers) on the Internet, a single group of dedicated servers (such as a corporate information center), or a single host server. One or more of the information repositories 101a-101n may be located at the site of a content provider, which includes an entity or individual that owns or is authorized to distribute the content. The content distributor 106 may also be located at the site of an entity or individual. Furthermore, the information repositories 101a-101n and the content distributor 106 may be operated by the same or different entities or individuals. Entities include, but are not limited to, television networks, cable service providers, music or film distributors, news media companies, distance learning centers, newspapers, news magazines, radio stations, motion picture production studios, home or local webcasters, or the like.

A user interacts with a corresponding client 114a-114n. A client 114a-114n can be a personal computer that includes a processor, transient memory (e.g., RAM), persistent memory (e.g., hard drive), an input device (e.g., mouse, keyboard, touch screen, stylus, voice command interface, or the like), and circuitry to provide communication paths among the other components. One or more clients 114a-114n can also be a personal digital assistant (PDA), cable box, set top terminal, enhanced telephone, mobile handset, or the like.

In one embodiment, one or more clients 114a-114n run an operating system that provides both a high-level user interface as well low-level input/output control and memory management, such as the WINDOWS™ operating system available from Microsoft Corporation. Clients 114a-114n can maintain a browser application program that provides an interface for accessing various types of content, such as video stills (JPEG, GIF, PNG, or the like) and video and audio clips (AVI, MOV, MPG, or the like). These multimedia support functions can be provided as web browser plug-ins. Clients 114a-114n can also include network interface hardware and software that provides the clients 114a-114n with the ability to transmit and receive data over the communications infrastructure 108.

The communications infrastructure 108 includes various combinations of wired and/or wireless local area networks (LAN), virtual LANs (VLAN), wide area networks (WAN), and metropolitan area networks (MAN), such as an organization's intranet, a local internet, the global-based Internet (including the World Wide Web (WWW)), an extranet, a virtual private network (VPN), licensed wireless telecommunications spectrum for digital cell (including CDMA, TDMA, GSM, EDGE, GPRS, CDMA2000, WCDMA FDD and/or TDD or TD-SCDMA technologies), and the like. The communications infrastructure 108 may support wired, wireless, or combinations of both transmission media, including satellite, terrestrial (e.g., fiber optic, copper, UTP, STP, coaxial, hybrid fiber-coaxial (HFC), or the like), radio, free-space optics, microwave, and/or any other form or method of transmission.

Content distributor 106 is communicatively coupled to information repositories 101a-101n and the clients 114a-114n. Although FIG. 1 shows content distributor 106 being directly linked to information repositories 101a-101n and indirectly linked to clients 114a-114n, the content navigation system 100 may be configured according to other embodiments to enable content distributor 106 to communicate with one or more information repositories 101a-101n via communications infrastructure 108, or enable content distributor 106 to have a direct communications link with one or more clients 114a-114n.

According to the embodiment of FIG. 1, content distributor 106 includes a content controller 102, a profile builder 165, and a profile data store 155. As described in greater detail below, the content controller 102 includes mechanisms for producing and deploying a customizable navigational guide for visualizing content that is relevant to a given user.

The profile builder 165 creates a profile for a user of a client 114a-114n. The user profile allows the content controller 102 to leverage personalized information while it filters and/or sorts content to enhance content relevancy. A number of mechanisms can be implemented to collect personalized information regarding a user including, but not limited to, use of a subscriber data form or navigation history. The profile builder 165 stores this information on a per user basis as one or more user profiles in a profile data store 155.

Figure 2:
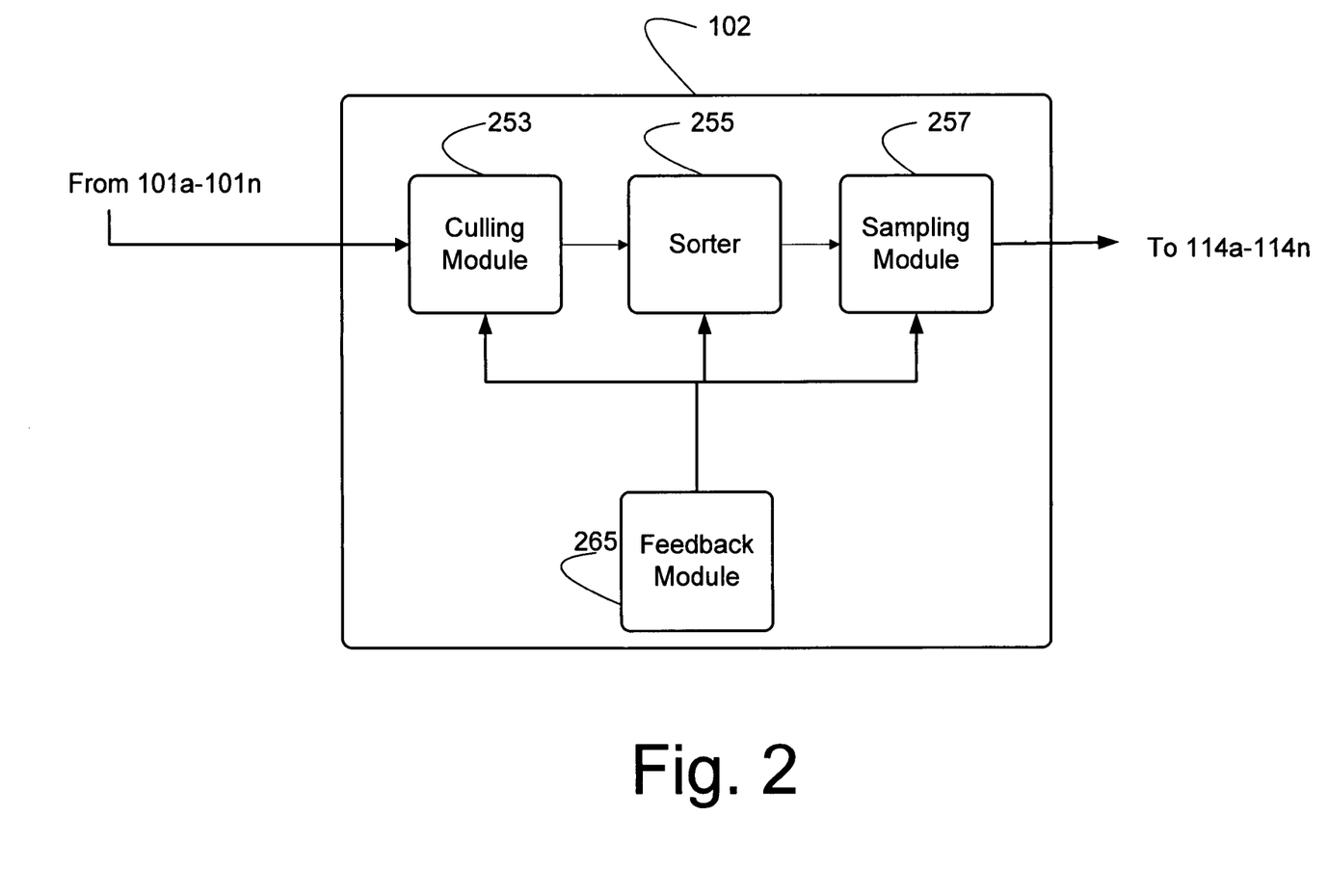
FIG. 2 illustrates a content controller according to one embodiment of the present invention.

FIG. 2 is illustrates one embodiment of a content controller 102, which comprises a culling module 253, a sorter 255, a sampling module 257, and a feedback module 265. Culling module 253 is communicatively coupled to one or more information repositories 101a-101n and a sorter 255. The culling module 253 includes one or more culling parameters that are applied to filter the corpus of content available at the information repositories 101a-101n. The culling module 253 reduces the initial size of the corpus to a more relevant subset. In one embodiment, the culling parameters include information pertaining to television programming available in a designated area, local laws and customs, copyright restrictions, digital rights management policies, browser application compatibility (which may be retrieved from a given client device), adult content restrictions, or the like. In another embodiment, the filter parameters are determined by accessing information stored in profile data store 155. The information stored in profile data store 155 may include, but not be limited to, geographical location, income, age, business classification, demographic information as well as certain particularized interest fields (e.g., sports, entertainment, news, business, and the like) designated by the user or obtained from a profile or other sources.

The output (e.g., relevant content) of culling module 253 is provided to sorter 255. The sorter 255 is operative to receive and sort the relevant content based on one or more sorting criteria. The one or more sorting criteria can include modification date, length, content rating, user rating, genre, number of downloads/page views, or the like. A given user or a group of users comprising a target market or social network of users may specify the sorting criteria. The specified sorting criteria may be stored in profile data store 155. In one embodiment, a default setting may be established for sorter 255. For instance, the content may be sorted by date in ascending order. Accordingly, a user may create or update a user profile to change the default setting to select alternative sorting criteria.

The sorter 255 is communicatively coupled to a sampling module 257. The sampling module 257 applies one or more sampling schemes against the sorted content to thereby select and forward a sample of the content to a designated client 114a-114n. The sampling schemes may be used to extract attribute information from the content to reduce the sampled content to a data structure that may be efficiently rendered by client 114a-114n. The sampling schemes may be random, random with weighting based on popularity, burtsiness, interestingness, directed (e.g., sampling specified quantity of blocks based on a given axis), or the like.

Content controller 102 also includes a feedback module 265. Feedback module 265 is communicatively coupled to culling module 253, sorter 255, and sampling module 257. Feedback module 265 includes mechanisms for refining the culling, sorting and sampling functions. For example with respect to culling module 253, feedback module 265 may track or monitor browsing habits for a given user, navigation history, frequency metrics, or the like, and provide updates to profile data store 155. Alternatively, or in conjunction with the foregoing, a given user may directly request updates to a corresponding user profile in profile data store 155. By tracking and integrating the changing interests and preferences of a single user or group of users (e.g., social network), the culling parameters for culling module 253 can be contemporaneously or periodically updated to enhance content relevancy.

With respect to sorter 255, feedback module 265 may utilize various combinations of active and passive methodologies to detect or update changes to the sorting criteria applied by sorter 255. Accordingly, sorting criteria can be contemporaneously or periodically updated to enhance the interestingness of the content distributed by content controller 102.

With respect to sampling module 257, feedback module 265 may utilize various combinations of active and passive methodologies to detect or update changes to the sampling schemes applied by sampling module 257. Therefore, the sampling rate can be automatically or manually adjusted to improve the efficiency and/or user desirability of the rendering operations at the designated client 114a-114n.

Figure 3A:
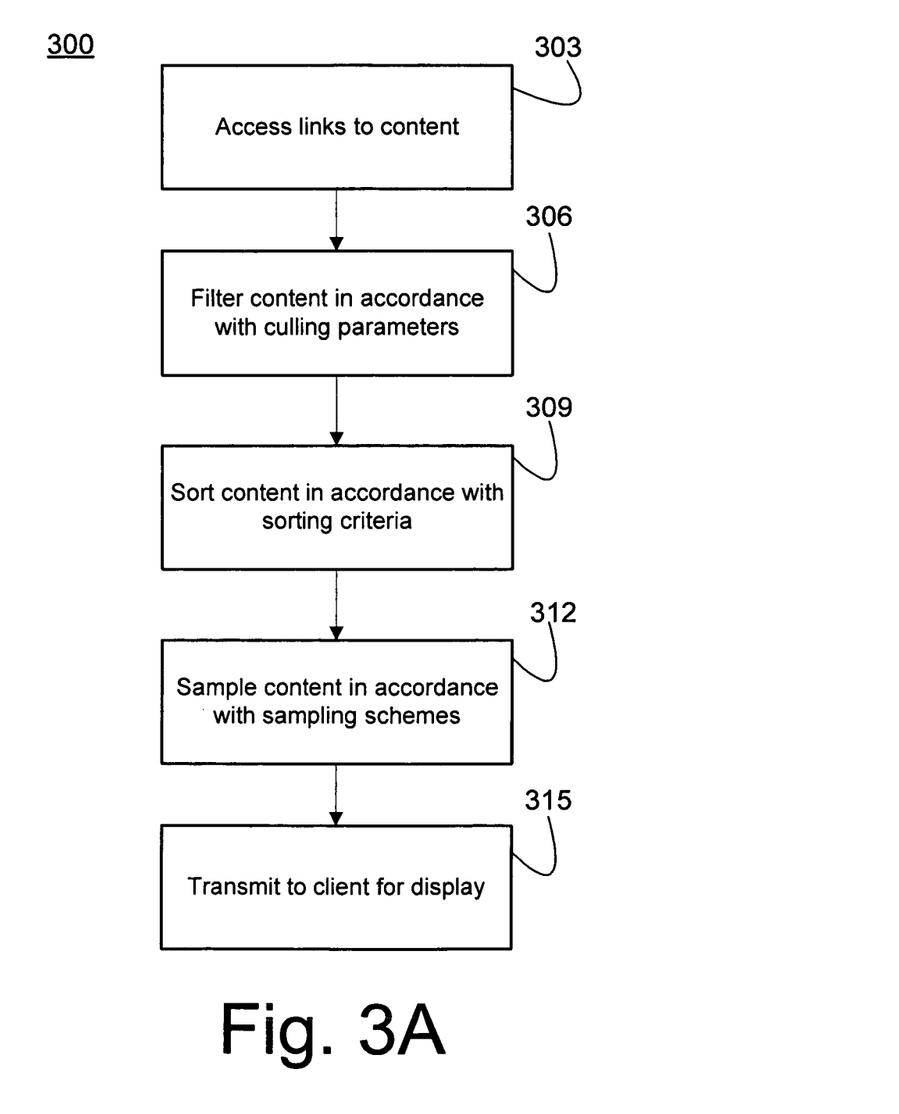
FIG. 3A illustrates a method for providing a customizable navigational guide for accessing relevant content according to one embodiment of the present invention.

Referring to FIG. 3A, flowchart 300 illustrates an embodiment of method for providing a customizable navigational guide for accessing relevant content by one or more users. The method of flowchart 300 may be implemented, for example, with system 100 described herein. A plurality of links to a corpus of content is accessed, step 303. In one embodiment, one or more tags are utilized to classify and access the content items. The tags, or other links, points to a specific location where a file containing a content item is stored in information repositories 101a-101n.

Using one or more culling parameters, the initial size of corpus is reduced to a more relevant subset for a given user or a combination of users, step 306. For example, the culling module 253 can be configured to filter or otherwise restrict tags that identify adult-oriented content when culling content to produce a navigational guide for under-aged users. Continuing with the present example, if a minor (or a user that is unable to provide age verification) operates a client 114a-114n to initiate a session with content distributor 106, the culling module 253 applies the culling parameters to block one or more content items having adult themes from being distributed to the user.

Upon identifying relevant content tags, the content is sorted in accordance with one or more sorting criteria, step 309. The sorting criteria enable further processing of the relevant content items to identify tags of greater interest to the designated user. For example, sorter 255 can be configured to sort all content tags by a combination of genre and modification date. Alternatively, sorter 255 can be reconfigured to sort the tags by any other sorting criterion or combination of sorting criteria, as described above. The sorted listing content tags are sampled, step 312, and transmitted, step 315, to a designated client 114a-114n to produce a customizable navigational guide. The sampling rate is determined by one or more sampling schemes selected by a sampling module 257.

As the user interacts with the navigational guide by playing and/or viewing content associated with the tags, historical user action can be collected and reported to the feedback module 265, as discussed above. The feedback information can be used to refine the culling, sorting, and sampling operations.

Thus, the methods and systems of the present invention enables a user to log into a web site (e.g., content distributor 106) to view a customizable navigational guide containing descriptive hyperlinks (e.g., tags) to a user's favorite television shows, movies, music videos, or the likes. The context of the navigational guide may be personalized in accordance with information stored in a user profile (e.g., profile data store 155). Upon activating one of the hyperlinks, a browser application installed on the client 114a-114n receives the requested file and renders the selected content. For example if the selected content is a clip of an on-demand television show available from CBS Broadcasting Inc., the client 114a-114n downloads or streams the video file containing television show by launching a MPEG protocol viewer, such as the WINDOWS MEDIA® PLAYER available from Microsoft Corporation.

Figure 3B:
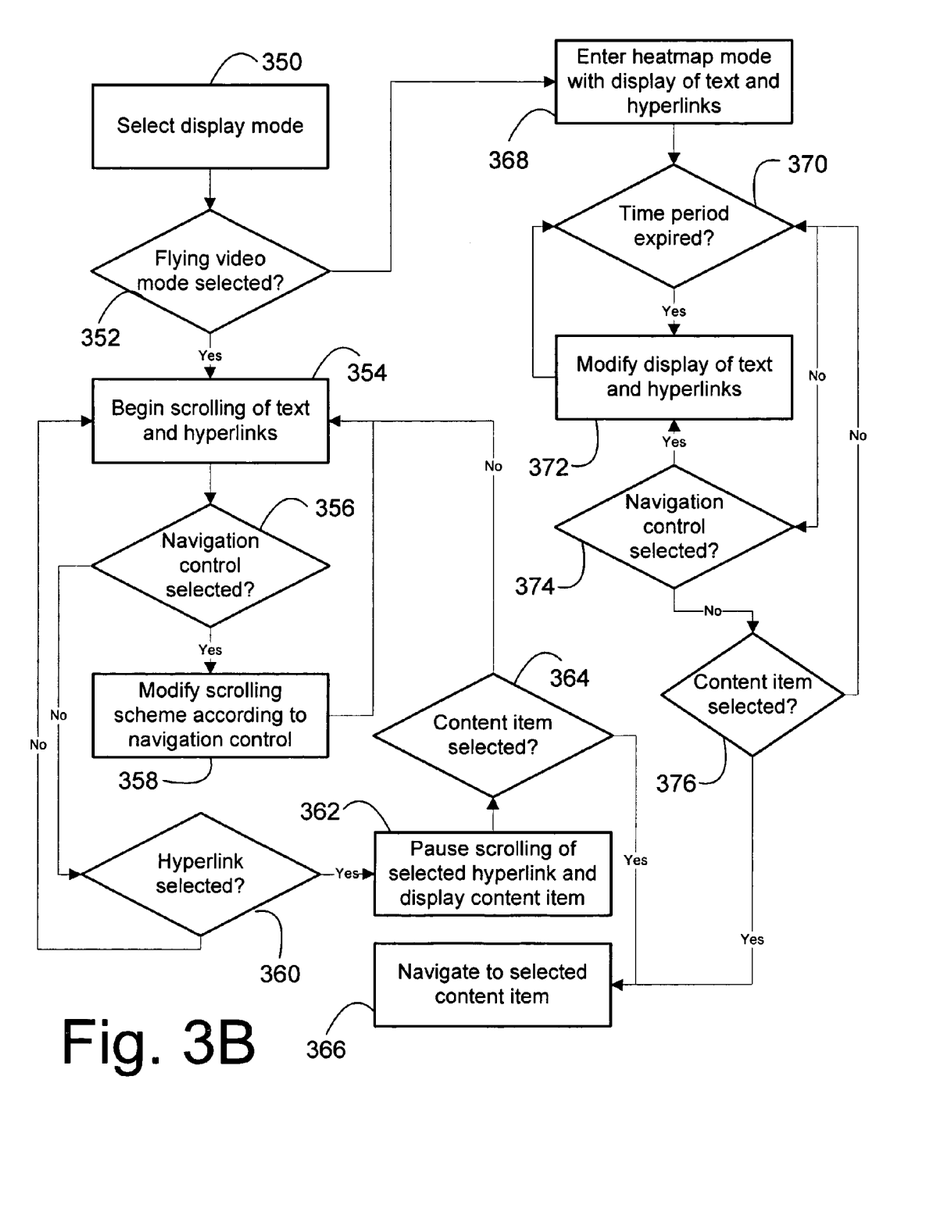
FIG. 3B illustrates a method a method for utilizing a customizable guide for accessing relevant content according to one embodiment of the present invention.

One embodiment of a method for utilizing a customizable navigation guide of the present invention is illustrated in FIG. 3B. The user receives the customizable navigation guide and selects a display mode, step 350. A check is made to determine if the user selects flying video mode, step 352, which is described in greater detail herein. If the user selects flying video mode, the content controller begins scrolling text and hyperlinks corresponding to one or more content items, step 354. During scrolling, the content controller performs a check to determine if the user selects a navigational control, step 356. Where the user selects a navigation control, such as fast-forward, rewind, pause, etc., the content controller modifies the scrolling scheme that it uses to display text and hyperlinks, step 358.

Where the check at step 356 evaluates to false, processing continues with a check to determine if the user selects a hyperlink associated with a content item, step 360. Where the user does not select a hyperlink, the content controller continues to scroll the text and hyperlinks on the display of the client device, step 354. If the user selects a hyperlink, step 360, the content controller pauses the scrolling of the selected hyperlink and displays a reference to the content item, ste362. According to one embodiment, selection of the hyperlink causes the content controller to present additional information regarding the content item or other content items that are related to the selected content item. Also, when the content controller pauses the scrolling of the selected hyperlink, text and hyperlinks associated with other content items may continue to scroll across the display device of the client. Another check is performed to determine if the user selects the content item, step 364, which if true, causes the client to navigate to the content item, step 366, e.g., loading a web page, tuning a TV channel, etc. Where the check at step 364 evaluates to false, the content controller continues to scroll the text and hyperlinks, step 354.

Returning to step 352 where the content controller determines if the user enters flying video mode, program flow is directed to step 368 when the user elects to enter heat map mode, step 368, with the content controller displays text and hyperlinks for tags that correspond to content items. As the content controller displays the text and hyperlinks, a check is performed to determine if a time period expires, step 370. Where the time period expires, the content controller modifies the display of text and hyperlinks, step 372, which may comprise removing one or more given text and associated hyperlinks and displaying new text and associated hyperlinks.

Where the time period has not expired, step 370, the content controller performs a check to determine if the user selects a navigation control, step 374. Where the user selects a navigation control, the content controller modifies the display of text and associated hyperlinks in accordance with the specific navigation control that the user selects, step 372. If the user does not select a navigation control another check is performed to determine if the user selects the content item, step 376, which if true, causes the client to navigate to the content item, step 366, e.g., loading a web page, tuning a TV channel, etc. Where the check at step 376 evaluates to false, the content controller continues to scroll the text and hyperlinks and again checks for expiration of the time period, step 370. It should be noted that in accordance with embodiments of the present process, the user may select a control to switch between heat map mode and flying video mode, causing program flow to proceed to step 352 upon selection of such a control.

Figure 4:
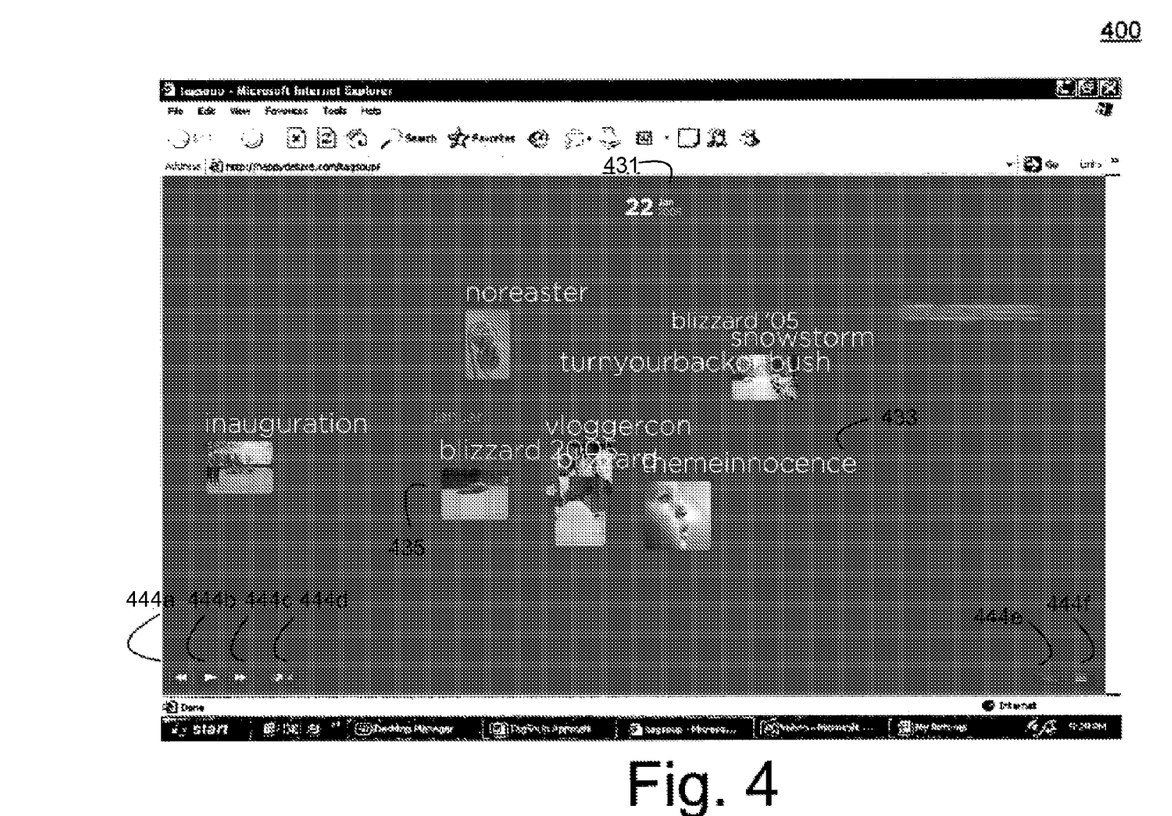
FIG. 4 illustrates a customizable navigational guide in flying video mode according to one embodiment of the present invention.

An embodiment of a customizable navigational guide 400 is illustrated in FIG. 4. Navigational guide 400 is shown in flying video mode, and includes a plurality of scrolling hyperlinks, which are shown as text 433 and thumbnails 435. The text 433 hyperlinks represent tags (or similar classifiers) that classify or categorize the content items (e.g., advertisements promoting television programs, film, audio, or the like). Thumbnail 435 hyperlinks represent links or pointers to the tagged content, and can be displayed as still images (e.g., from a JPEG or GIF file) or animated video clips. Accordingly, each text 433 hyperlink includes one or more thumbnail 435 hyperlinks representing the available content per tagged category and displayed under the control of the content controller.

The text 433 and thumbnail 435 hyperlinks are produced from the output of the culling, sorting, and sampling operations of content controller 102. The text 433 and thumbnail 435 hyperlinks are sorted on navigational guide 400 by modification date as indicated by a sorting indicator 431. The sorting indicator 431 is determined by the sorting criteria, which is governed by sorter 255.

According to one embodiment, text 433 and thumbnail 435 hyperlinks scroll or travel across the display area of navigational guide 400 from left-to-right to produce a flying video effect. In an embodiment, before a specific set of the text 433 and thumbnail 435 hyperlinks glide off of the display area, the set of hyperlinks pauses for a given time period (e.g., after twenty seconds) at some fixed point on the display area. Other suitable special effects could be used to remove the text 433 and thumbnail 435 hyperlinks from the display area. Examples of suitable special effects include collapse, dissolves, explodes, or the like.

A user may adjust the scrolling effects of the text 433 and thumbnail 435 hyperlinks by actuating one or more of the navigation control buttons located at the bottom of the navigational guide 400. The navigation control buttons include rewind button 444a, a play/pause button 444b, a fast-forward button 444c, and a sampling rate button 444d and allow the user to transmit navigation commands to the content controller.

Play/pause button 444b enables a user to pause or activate the "flying-video" or scrolling motion of the text 433 and thumbnail 435 hyperlinks, which indicates the flying video mode. Rewind button 444a enables the user to select a previous date, as represented by sorting indicator 431. Fast-forward button 444c enables the user to select a subsequent date. The sampling rate button 444d enables the user to adjust the velocity (e.g., sampling rate) of the scrolling text 433 and thumbnail 435 hyperlinks.

If, while perusing navigational guide 400, a user locates a text 433 or thumbnail 435 hyperlink of interest, the user may pause the motion of the text 433 and thumbnail 435 hyperlinks by positioning a mouse cursor directly over the text 433 and thumbnail 435 hyperlinks. If the user takes no further action, the content controller may resume the scrolling motion of the text 433 and thumbnail 435 hyperlinks after a specified time period. Alternatively, or in conjunction with the foregoing, the user may select a given thumbnail 435 hyperlink to populate a playback queue or a playlist. The thumbnail 435 hyperlink may be selected, e.g., by clicking a mouse, dragging-and-dropping a thumbnail 435, or the like. The user may subsequently activate the playback queue or playlist to start viewing or playing the content associated with the selected thumbnail 435 hyperlinks.

Additionally, at the lower right corner of navigational guide 400 are two display mode buttons, which in the present example are a flying video mode button 444e and a heat map mode button 444f. Flying video mode button 444e configures navigational guide 400 to display text 433 and thumbnail 435 hyperlinks in flying video mode, as discussed. Activating heat map mode button 444f instructs the content controller to switch the navigational guide 400 from flying video mode to heat map mode.

Figure 5:
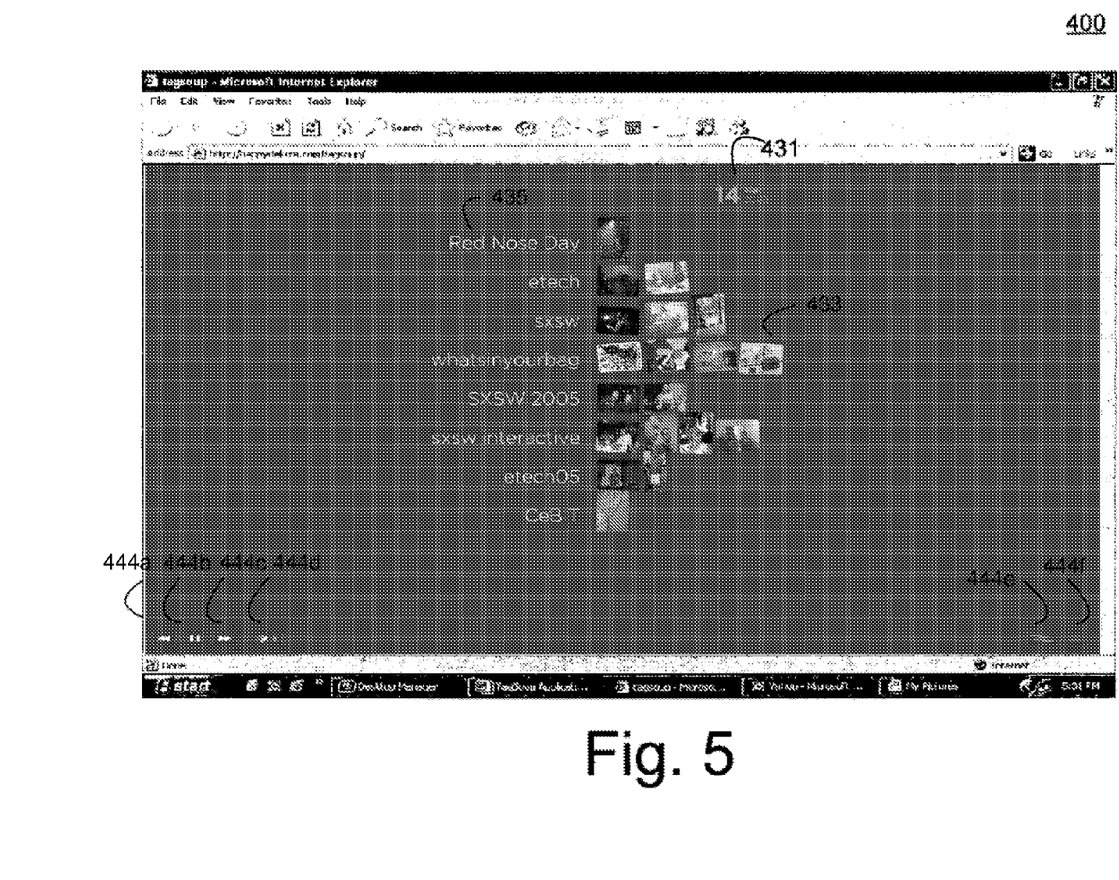
FIG. 5 illustrates customizable navigational guide in heat map mode according to one embodiment of the present invention.

One embodiment of the navigational guide 400 in heat map mode is illustrated in FIG. 5. In heat map mode, the text 433 is presented in one or more vertical columns on the left side of the display area. On the right side of the display area, corresponding thumbnail 435 hyperlinks are queued. In a timed sequence based on the above-described sampling scheme, the text 433 and thumbnail 435 hyperlinks are periodically replaced or updated with a new set of text 433 and thumbnail 435 hyperlinks.

To produce a heat map effect, the text 433 or thumbnail 435 hyperlinks are visually distinguished to identify content items having a higher degree of relevancy or interestingness, including popularity, burstiness, or the like. For example, if other members of a user's buddies list are currently viewing on-demand downloads of a particular television program, the thumbnail 435 hyperlink to the television program may be displayed with a differently colored frame than the other thumbnail 435 hyperlinks in the navigational guide. The color differentiation has the effect of drawing attention to a given content item and thereby indicating the program's current popularity. Other digital special effects can be used in addition to or in lieu of color distinctions. For example, the content can be visually distinguished by allowing the thumbnail 435 hyperlink to fade, spin, blink or the like. In other examples, multiple color schemes or styles of dynamic media can be used to produce a layer of depth or gradation for heated content.

As described above, the thumbnail 435 hyperlinks are pointers to various content that has been culled and sorted for relevance and interests to a given user. The content may comprise on-demand television programs, movies, audio, or the like. The content represented by the thumbnail 435 hyperlinks may also include advertisements, public service announcements, and other promotions. The advertisements and the like can be culled and sorted as discussed with reference to FIG. 2. Alternatively, or in conjunction with the foregoing, advertisements may be delivered to the navigational guide 500 in addition to the text 433 and thumbnail 435 hyperlinks. The advertisements may be displayed in a pop-up, banner, slider, and other types of presentations. Additionally, the advertisements may be linked to a given item of text 433 or thumbnail 435 hyperlink, such that when a user activates a link or receives content associated with a link, the user also receives the linked advertisement.

The direct or indirect integration of one or more advertisements enables system 100 to be used as a profit generator for the operators of the information repositories 101a-101n and/or the content distributor 106. The advertisements can be related to the context of the text 433 and thumbnail 435 hyperlinks, targeted to specific users, or non-targeted advertisements. The advertisements can be priced and sold to sponsors based on context, targeted market, hits, downloads, click-throughs, page views, or the like. Accordingly, the advertisements allow an operator of content distributor 106 to generate revenues from parties who wish to display advertisements on the customizable navigational guide 400.

In one embodiment, when the user interacts with the customizable navigational guide 400 by selecting rendered text 433 and thumbnail 435 hyperlinks, a profile builder may record these choices and use them to create a user profile at profile data store 155. In other words, user behavior (e.g., browsing, purchasing content items, or the like) contributes additional information to the content controller 102 for its use in improving and refining the profile information of each user. In this instance, the user profiles in profile data store 155 are automatically updated to reflect the changing interests and preferences of users. As a result, the feedback module 265 dynamically adjusts the appropriate culling module 253, sorter 255, or sampling module 257 based on user behavior.

For example, if a user consistently selects only thumbnail 435 hyperlinks corresponding to comedy and sports programs, then the content controller 102 may produce or update the customizable navigational guide to include only comedy and sports programming. Alternatively, the content controller 102 can produce or update the customizable navigational guide to include all types of television programming. In this alternative, the text 433 and thumbnail 435 hyperlinks corresponding to comedy and sports programming are visually distinguished from the text 433 and thumbnail 435 hyperlinks corresponding to other content. For instance, the text 433 and thumbnail 435 hyperlinks corresponding to comedy and sports programming may appear in larger fonts and cycle more frequently than the text 433 and thumbnail 435 hyperlinks corresponding to the less-relevant categories.

FIGS. 1 through 5 are conceptual illustrations allowing an explanation of The present invention. It should be understood that various aspects of the embodiments of The present invention could be implemented in hardware, firmware, software, or a combination thereof. In such an embodiment, the various components and/or steps would be implemented in hardware, firmware, and/or software to perform the various functions of the present invention. That is, the same piece of hardware, firmware, or module of software could perform one or more of the illustrated blocks (e.g., components or steps). Unless explicitly stated otherwise herein, the ordering or arrangement of the steps and/or components should not be limited to the descriptions and/or illustrations hereof.

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). Moreover, it is not intended for any term in the specification or claims to be ascribed an uncommon or special meaning unless explicitly set forth as such. Further, the present invention encompasses present and future known equivalents to the known components referred to herein by way of illustration. While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method comprising:
   electronically accessing tagged content from a corpus of content;
   electronically applying, via a processing device, one or more culling parameters, at least one of the one or more culling parameter being not specified by one or more users, to the corpus of content to identify relevant content tags for the one or more users;
   receiving one or more sorting criteria specified for the one or more users associated with the one or more users;
   electronically sorting, via the processing device, the relevant content tags according to the one or more sorting criteria;
   sampling the sorted content tags to extract text and thumbnail hyperlinks from the sorted content tags in an order according to the sorting at a sampling rate;
   refining, via a feedback module executed by the processing device, the culling parameters, sorting criteria, and sampling, the refining of the culling parameters comprising tracking a culling parameter statistic selected from a group of culling parameter statistics consisting of browsing habits for a given user, tracking and integrating changes for a single user or group of users, navigation history, and frequency metrics comprising metrics related to displaying larger fonts and cycling more frequently;
   presenting the sampled content tags in a flying video mode at the sampling rate in a customizable guide to an end-user.

2. The method of claim 1, comprising:
   applying one or more sampling schemes to the sorted content tags, wherein the presenting is executed to sample and present the sorted content tags in accordance with the one or more sampling schemes.

3. The method of claim 2, wherein the applying one or more sampling schemes comprises popularity, burstiness of data transmission, interestingness, or a combination thereof.

4. The method of claim 1, comprising:
   enabling a user to adjust one or more of the culling parameters or the one or more sorting criteria.

5. The method of claim 1, wherein the accessing comprises accessing at least one of software, video, graphics, text, or audio.

6. The method of claim 1, wherein the applying one or more culling parameters comprises identifying a relevant content based on copyright law considerations, geographical areas to distribute content, television programming, local laws and customs, user interface compatibility, purchaser demand for a type of content, user profiles, or a combination thereof.

7. The method of claim 1, wherein the sorting comprises sorting the relevant content tags according to creation date, modification date, length, content rating, user rating, genre, number of downloads, or a combination thereof.

8. A system for providing a customizable guide for navigating a corpus of content, comprising:
   a content server communicatively coupled to one or more client devices via the communications system, the content server comprising:
   a culling module configured to apply one or more culling parameters to the corpus of content to identify relevant content tags for one or more users, at least one of the one or more culling parameter being not specified by the one or more users;
   a sorter configured to implement one or more sorting criteria to sort the relevant content tags, wherein the sorter receives input from one or more users associated with the one or more users, said input specifying one or more sorting criteria;

a sampling module configured to sample the sorted content tags to extract text and thumbnail hyperlinks from the sorted content tags in an order according to the sorting at a sampling rate;

a feedback module configured to refine the culling parameters, sorting criteria, and sampling, the refining of the culling parameters comprising tracking a culling parameter statistic selected from a group of culling parameter statistics consisting of browsing habits for a given user, tracking and integrating changes for a single user or group of users, navigation history, and frequency metrics comprising metrics related to displaying larger fonts and cycling more frequently; and a presenting module configured to present the sampled content tags in a flying video mode at the sampling rate in a customizable guide to an end-user.

9. The system of claim 8, comprising:
a sampling module that applies one or more sampling schemes to the sorted content tags, wherein the sampling module presents the sorted content tags in accordance with the one or more sampling schemes.

10. The system of claim 9, wherein sampling schemes comprise popularity, burstiness of data transmission, interestingness; or a combination thereof.

11. The system of claim 8, comprising:
a feedback module that receives user input.

12. The system of claim 8, wherein the corpus of content includes at least one of software, video, graphics, text, or audio.

13. The system of claim 8, wherein the culling parameters comprise copyright law considerations, geographical areas to distribute content, television programming, local laws and customs, user interface compatibility, purchaser demand for type of content, user profiles, or a combination thereof.

14. The system of claim 8, wherein the sorting criteria comprise creation date, modification date, length, content rating, user rating, genre, number of downloads, or a combination thereof.

15. A non-transitory computer readable storage medium having computer readable program code embedded in said medium for causing a computer to provide a customizable guide for navigating a corpus of content within a distributed communications system, the computer readable program code comprising:

computer readable program code that causes the computer to apply one or more culling parameters to the corpus of content to identify relevant content tags for one or more users, at least one of the one or more culling parameter being not specified by the one or more users;

computer readable program code that causes the computer to receive one or more sorting criteria from one or more users associated with the one or more users;

computer readable program code that causes the computer to implement the one or more sorting criteria to sort the relevant content tags;

computer readable program code that causes the computer to sample the sorted content tags to extract text and thumbnail hyperlinks from the sorted content tags in an order according to the sorting at a sampling rate;

computer readable program code that causes the computer to refine the culling parameters, sorting criteria, and sampling, the refining of the culling parameters comprising tracking a culling parameter statistic selected from a group of culling parameter statistics consisting of browsing habits for a given user, tracking and integrating changes for a single user or group of users, navigation history, and frequency metrics comprising metrics related to displaying larger fonts and cycling more frequently;

computer readable program code that causes the computer to present the sampled content tags in a flying video mode at the sampling rate in a customizable guide to an end-user.

16. The computer readable storage medium according to claim 15, comprising:
computer readable program code that causes the computer to apply one or more sampling schemes to the sorted content tags to sample and present the sorted content tags in accordance with the one or more sampling schemes.

17. The computer readable storage medium of claim 16, wherein sampling schemes comprise popularity, burstiness of data transmission, interestingness; or a combination thereof.

18. The computer readable storage medium of claim 15, comprising: computer readable program code that causes the computer to receive user input for adjusting at least one of the culling parameters or the sorting criteria.

19. The computer readable storage medium of claim 15, wherein the culling parameters comprise copyright law considerations, geographical areas to distribute content, television programming, local laws and customs, user interface compatibility, purchaser demand for type of content, user profiles, or a combination thereof.

20. The computer readable storage medium of claim 15, wherein the sorting categories comprise creation date, modification date, length, content rating, user rating, genre, number of downloads, or a combination thereof.

21. The method of claim 1, wherein in the flying video mode, the sampled content tags are displayed in the customizable guide in the form of at least one text hyperlink and at least one thumbnail hyperlink that automatically move across the guide in a flying motion at the sampling rate in the order according to the sorting for a duration of the customizable guide in the flying video mode when navigation control is activated in the flying video mode of the customizable guide,
wherein the method further comprises:
receiving a selection of a given moving content tag from the end-user during the flying video mode of the customizable guide; and
providing the content associated with the selected tag to the end-user.

22. The system of claim 8, wherein in the flying video mode, the sampled content tags are displayed in the customizable guide in the form of at least one text hyperlink and at least one thumbnail hyperlink that automatically move across the guide in a flying motion at the sampling rate in the order according to the sorting for a duration of the customizable guide in the flying video mode when navigation control is activated in the flying video mode of the customizable guide,
wherein the system further comprises:
the content server configured to receive a selection of a given moving content tag from the end-user during the flying video mode of the customizable guide, and provide content associated with the selected content tag to the end-user.

23. The computer readable storage medium of claim 15, wherein in the flying video mode, the sampled content tags are displayed in the customizable guide in the form of at least one text hyperlink and at least one thumbnail hyperlink that automatically move across the guide in a flying motion at the sampling rate in the order according to the sorting for a duration of the customizable guide in the flying video mode when navigation control is activated in the flying video mode of the customizable guide,
> wherein the computer program product further comprises:
> computer readable program code that causes the computer to receive a selection of a given moving content tag from the end-user during the flying video mode of the customizable guide; and
> computer readable program code that causes the computer to provide content associated with the selected content tag to the end-user.

\* \* \* \* \*